Figure 1:
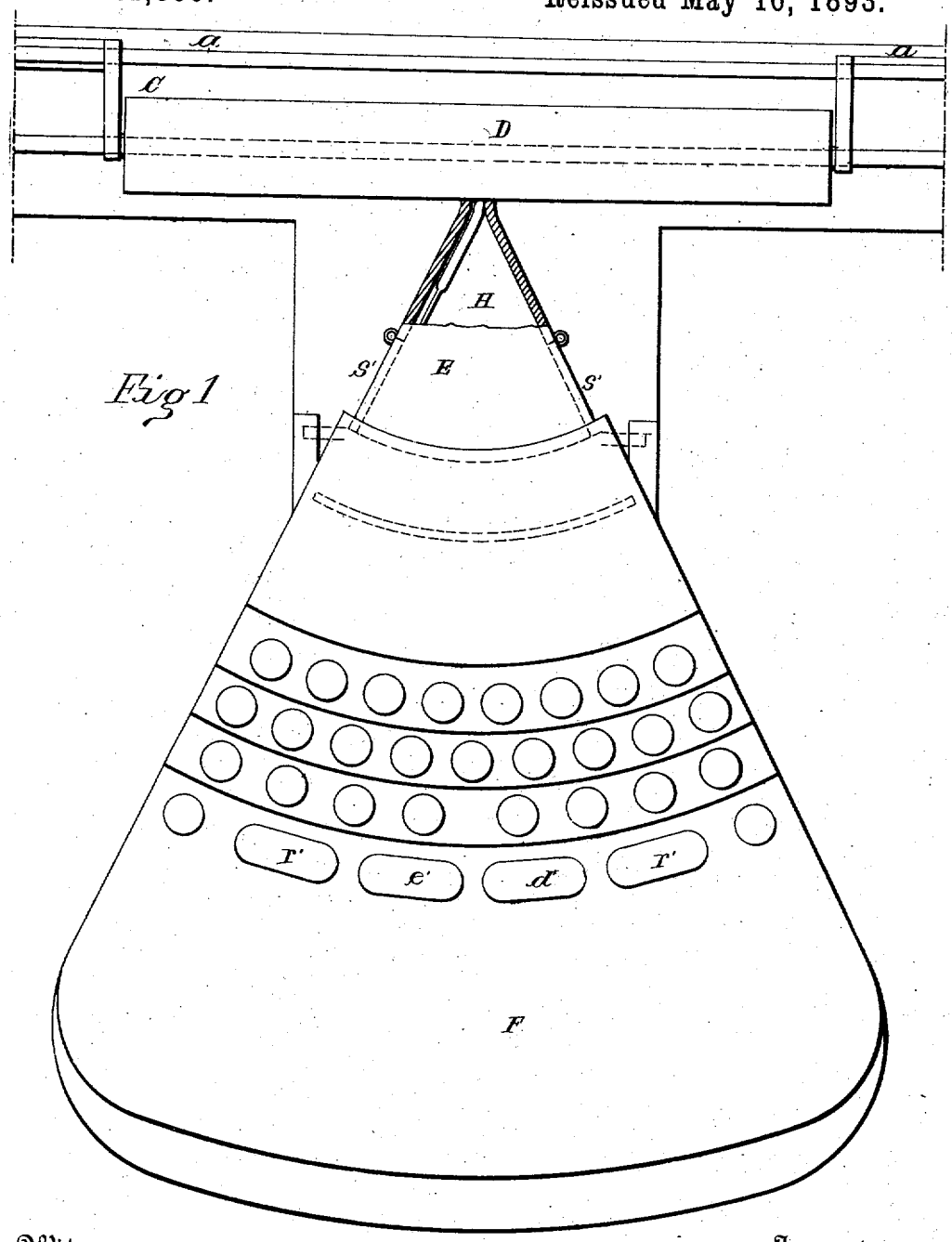

2 Sheets—Sheet 1.

E. A. FORD.

TYPE WRITING MACHINE.

No. 11,339. Reissued May 16, 1893.

Witnesses
C. C. Burdine
Rewz Lewis.

Inventor
Eugene A. Ford
by Pollock & Mann
Attorneys

THE NORRIS PETERS CO., WASHINGTON, D. C.

2 Sheets—Sheet 2.

E. A. FORD.

TYPE WRITING MACHINE.

No. 11,339. Reissued May 16, 1893.

Witnesses
C. C. Burdine
Reuben Lewis

Inventor
Eugene A. Ford
by Pierce & Mason
Attorneys

THE NORRIS PETERS CO., WASHINGTON, D. C.

UNITED STATES PATENT OFFICE.

EUGENE A. FORD, OF NEW YORK, N. Y., ASSIGNOR TO GEORGE HOLL, OF SAME PLACE.

TYPE-WRITING MACHINE.

SPECIFICATION forming part of Reissued Letters Patent No. 11,339, dated May 16, 1893.

Original No. 472,870, dated April 12, 1892. Application for reissue filed July 2, 1892. Serial No. 439,343.

*To all whom it may concern:*

Be it known that I, EUGENE A. FORD, of the city, county, and State of New York, have invented a new and useful Improvement in Type-Writing Machines, which is fully set forth in the following specification.

The main object of my invention is to construct a simple and efficient shifting mechanism, whereby a large number of characters may be printed from a few keys, without shifting the platen, and whereby the type-bars may be accurately guided to the printing point.

Prior to my invention it has been proposed to shift the type-bars (they having each two or more characters) instead of shifting the heavy carriage and platen as in the well-known Remington machine. To this end the key-levers and type-bars have been pivoted upon a tilting frame, capable of being thrown at will into either of two positions, so as to bring either one or the other of the characters of the type-bar to the printing point.

According to my invention, the type-levers and type-bars are not carried by a shifting frame, but the key-levers are pivoted to a fixed support and each type-bar is pivoted to the end of the key-lever in such manner that, in addition to the ordinary stroke for printing, imparted by said lever, the type-bar can move independently thereof to bring any one of its characters into printing position. With the type-bars so mounted, are combined shifting devices under the control of the operator, for imparting to the type-bar, a movement in the direction of the alignment of the type, *i. e.*, transversely to the printing stroke. This shifting device may, and does preferably perform also the function of a guide, controlling the head or printing end of the type-bar to the moment of impact with the platen. In making a shift, therefore, it is not necessary to move a frame carrying all the key-levers and type-bars. No key-levers move at all, and only that type-bar need be materially displaced, which at the time being is in operation. There is consequently a minimum weight of the shifting parts, giving a lighter shift and much quicker action. When a heavy frame is used, the spring that returns it must be proportionately strong, and the resistance of this spring must be overcome by the operator in making a shift. Additional advantages are durability, cheapness and simplicity of construction.

My invention further comprises an improved quick-action feed mechanism for the carriage, as hereinafter specifically described.

In order that my invention and the manner in which the same is carried into effect may be fully understood, I will describe in detail a machine constructed in accordance therewith, reference being had to the accompanying drawings which form part of this specification.

Figure 2:
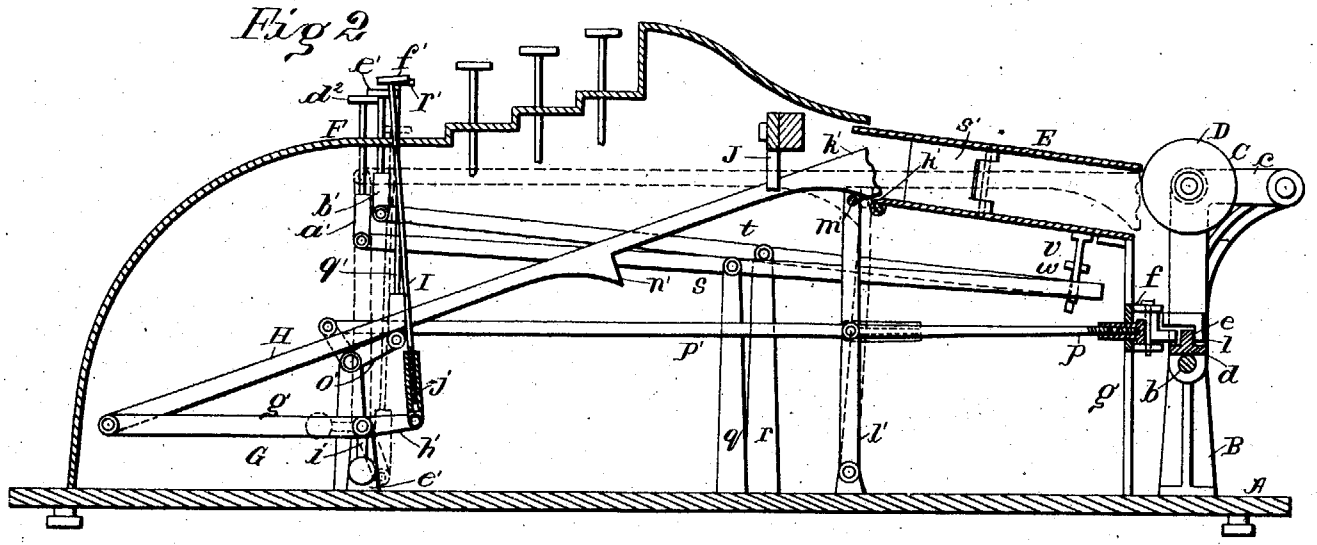
Figure 4:
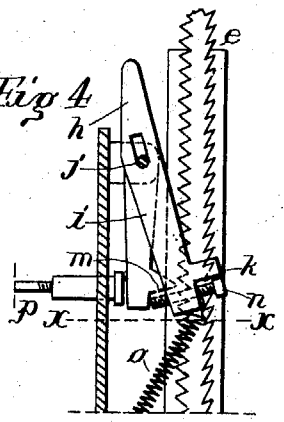
Figure 3:
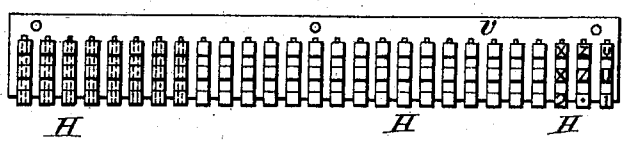

Figure 1, is a plan view, partly in section, of my improved type-writing machine. Fig. 2, is a vertical longitudinal section. Fig. 3, is an end elevation of the type-bars, showing the type-bar guide; and Fig. 4, is an enlarged plan view of the carriage feeding mechanism.

Similar letters of reference indicate corresponding parts in all the views.

To the base A, which supports all the working parts of the machine, are attached rearwardly curved pillars B, supporting rods *a b*, and upon the said rods are loosely placed the end pieces *c* of the frame of the paper-carriage C. In the said frame is supported the paper supporting roller D. The end pieces *c* are connected with a longitudinal bar *d*, carrying a double-rack bar *e*. Between ears *f*, projecting rearwardly from the support *g*, are placed the pawls *h i*. The said pawls are held in place by a pin *j*, projecting through the ears *f* and through a circular hole in the pawl *i* and an oblong hole in the pawl *h*. The pawl *h* is provided with a right-angled arm *k*, furnished with a downwardly projecting V-shaped finger *l*, which engages the teeth of the rear surface of the rack-bar *e*. The pawl *i* is furnished with a V-shaped finger *m*, which engages the forward slide of the rack-bar *e*. In the pawl *h*, near its free end, is inserted an adjusting-screw *n*, which normally rests upon the side of the pawl *i* at its free end. The pawl *h* is held in engagement with the teeth of the rear side of the rack-bar by a spiral spring *o*, connected with the pawl and with a fixed support. The pawl-and-ratchet mechanism is operated by a rod *p* in the manner presently to be described To the fixed support in front of the paper supporting roller D is pivoted a triangular type-bar guide E, the smaller end of the guide, adjoining the paper-supporting roller D, being provided with an opening of the width and height of the end of one of the type-bars. The narrower end of the guide E normally rests upon the top of the support *g*, so that the guide is used in this position while printing the frequently-recurring letters and characters. The side walls of the triangular guide which converge to this narrow end, constitute guide-strips which control the head or printing end of the type-bar, and direct the latter to the slot or opening. In standards *q r*, attached to the base A, are pivoted levers *s t*, provided at their rear ends with studs *v w* for engaging and lifting the type-bar guide E. The stud *w* is made shorter than the stud *v*, so that when the lever *t* is tilted and the stud is raised until the free end of the lever *t* strikes the angled upper end of the support *g*, the type-bar guide E will be raised sufficiently to bring the central letter or character on the end of the type-bar into position for printing. In a similar manner the longer stud *v*, carried by the lever *s*, will raise the type-bar guide E when the said lever is moved, so as to bring the lower character on the end of the type-bar into position for printing. The forward ends of the levers *s t* are connected with rods *a′ b′*, which extend upwardly through the casing F of the machine, and are provided at their upper ends with finger-pieces *c′ d′*, so that by pressing these keys the type-bar guide may be raised in the manner described.

In standards *e′*, secured to the base A near the front thereof, are pivoted the key-levers G, which are connected with type-bars H and with rods I, extending through the casing F and provided at their upper ends with finger-pieces *f′*. As all of the type-bars, type-operating levers, and parts connected therewith are alike in all respects as to position in the machine and the form of their free ends, a description of one bar, and the mechanism connected therewith will answer for the whole.

The lever G is formed of the longer arm *g′*, the shorter arm *h′*, and the weighted arm *i′*, extending approximately at right angles in the main portion of the lever opposite the pivotal point. The shorter arm *h′* is pivotally connected with the internally-threaded sleeve *j′*, into which is screwed the threaded lower end of the rod I. The free extremity of the longer arm *g′* of the lever G is pivotally connected with the type-bar H, and the said type-bar extends forward and projects into the forward end of the guide E. In front of the guide E is supported a slotted plate or comb J, which receives at each of its slots a type-bar, as shown in Fig. 3.

The free end of the type-bar H is widened, and in the present case carries type for producing three letters or characters. Either of the characters may be brought into position for printing by tilting the guide E in the manner already described. To permit of this movement of the guide and at the same time to preserve the alignment of the type, the end of the type-bar is provided above and below with convex projections *k′*. The rod *p* of the carriage-feeding mechanism is pivoted to a portion of the lever *l′*, which turns on fixed pivots in the lower part of the machine-casing, and connected at their upper ends by a rod *m′*. The said rod lies in the path of a projection *n′* on the lower edge of the type-bar, so that as the type-bar is moved forward, the impact of the projection *n′* on the rod *m′* moves forward the rod *p*, which pushes the pawl *i* forward, so as to bring the projection *m* into engagement with the teeth on the front side of the ratchet-bar *e*, at the same time, through the medium of the screw *n*, pushing the triangular finger *l* out of engagement with the ratchet teeth on the back side of the bar *e*, thereby releasing the bar from the pawl *h* and causing it to be held by the pawl *i*. At the same time the spring *o* draws the pawl *h* forward ready for re-engagement with the ratchet-bar after its release, which occurs when the rod *p* moves forward, allowing the pawl *i* to slip out of engagement with the ratchet-bar. The carriage after the release of the ratchet-bar in the manner described is moved forward one notch by a spring or weight in the usual way.

To provide for spacing without printing, an angled lever *o′*, pivoted in a standard projecting from the base A, is connected at one end by a rod *p′* with the levers *l′*, and is pivotally connected at the other end with the rod *q′*, which extends upwardly through the casing and is furnished with a finger-piece *r′*. Whenever it is desired to space without printing, the pressure of the finger upon the finger-piece *r′* tilts the lever *o′*, pushes forward the rod *p′*, and releases the feeding mechanism in the manner already described. An inking-ribbon of the usual description will be interposed between the type-bar E and the paper supported by the roller D.

To facilitate cleaning the type, the sides of the type-bar guide E are provided with hinged doors *s′*, which may be opened for the introduction of a brush. The central type-bars are made straight; but the lateral ones are curved slightly to accommodate them to the type-bar guides.

Having thus described my invention, I claim as new and desire to secure by Letters Patent—

1. In a typewriting machine, the combination of a series of key-levers, a series of type-bars each directly pivoted to its lever and movable independently thereof transversely to the printing stroke, each type-bar being provided with two or more characters, and a shifter or guide at the free ends of the type-bars and under the control of the operator, for shifting said bars at will in the direction of the alignment of the type, substantially as described.

2. The combination of a series of key-levers pivoted each to a fixed support, a series of type-bars having each two or more characters and directly jointed each to a key-lever so as to receive a printing stroke longitudinally of said bar, and a shifting guide controlling the free ends of said type-bars for moving the same transversely to the printing stroke, substantially as described.

3. The combination of a series of type-bars each having two or more characters, means for reciprocating them longitudinally toward and from the printing roller, and a swinging guide having a slot or orifice common to all the type-bars, substantially as described.

4. The combination of a series of type-bars having each two or more characters, key-levers for reciprocating the type-bars, and a swinging guide converging to a slot or orifice close to the printing roller, the free ends of all the type-bars resting loosely upon said guide, substantially as described.

5. In a type-writing machine the combination of a series of type-bars H, the fixed slotted guide J, the triangular type-bar guide E for causing the type-bearing ends of the type-bars to register, and the type-bar-actuating mechanism consisting of levers G, rods I, and finger pieces $f'$, substantially as specified.

6. The combination with the horizontal platen, of a vertically swinging hollow guide having its sides converging toward the platen, levers acting against the lower side of the hollow guide to raise it into two new positions, a series of type-bars having vertically aligned type or characters on their forward ends, and operating devices for projecting the type-bars forwardly through the hollow-guide and its contracted forward end into contact with the platen or paper thereon, substantially as set forth.

7. In a type-writer, the combination, with a series of type-bars converging at their forward ends, each provided with vertically aligned type or characters, and keys having a lever connection with the rear ends of the bars, of a hollow vertically swinging guide hinged at its rear end and having a contracted opening at its forward end of a size to firmly guide the forward end of a single type-bar, vertically-swinging levers beneath the said hollow guide and constructed to raise its forward end into two new positions, and a key mechanism adjacent to the keys of the type-bars to be operated simultaneously therewith or separately and connected with the guide-elevating levers, substantially as set forth.

8. The combination with a series of horizontal levers pivoted near their forward ends, a series of converging type-bars pivoted at their lower ends to the long radial arms of said levers and inclined upwardly and forwardly therefrom, vertically aligned type or characters on the forward end of said bars, and a series of vertically-extending key-rods pivoted at their lower ends to the forward ends of said levers to raise the type-bars into a horizontal position and project them forwardly to a common printing point, of a vertically-swinging hollow guide pivoted at its rear end adjacent to the upper forward ends of the type-bars, and levers acting on the said hollow guide to elevate its free end into two new positions, substantially as set forth.

9. The combination, with the inclined converging type-bars each having on its forward end vertically-aligned type or characters, the keys connected with said bars, and a stationary bar having vertical slots, through which the converging upper ends of the type-bars pass, of a vertically swinging hollow guide pivoted at its rear end adjacent to the upper forward ends of the type-bars and tapering forwardly to receive and firmly guide the printing end of a single type-bar, and key-actuated levers acting on the lower side of the hollow guide to raise it into two new positions, substantially as set forth.

10. The combination with the vertically swinging type-bar guide and a rest limiting the downward movement of its forward end, of the vertically-swinging key-levers extending forwardly under said guide and beneath its rest to engage the latter when their forward ends are swung up, and upwardly projecting studs on the forward ends of said levers and one projecting higher than the other to engage the lower side of the hollow guide and raise its forward end into two new positions, substantially as set forth.

11. The combination with the paper-carriage, its spacing mechanism having a key-operated rod, and intermediate vertical levers pivoted between their ends to the said rod and connected at their upper ends by a cross bar or rod, of the inclined type-bars crossing at their forward ends the said cross-bar and having depending lugs to engage it and rock the vertical levers forwardly to actuate the spacing mechanism, vertically-aligned type or characters on the forward ends of the said bars, keys for actuating the type-bars, and a vertically swinging hollow guide contracted at its forward end to form a common printing opening and pivoted at its rear end adjacent to the upper ends of the type bars, and key-operated levers acting on the lower side of the hollow guide to raise its forward end to two new positions, substantially as set forth.

12. In a type-writing machine the combination of the type-bars H, provided with projections $n'$, the levers $l'$, and pawl-and-ratchet mechanism connected with the paper carriage and arranged to be operated by the impact of the type-bar through levers $l'$ and their connections, substantially as specified.

13. In a type writing machine, the combination, with the paper-carriage and printing mechanism, of the double ratchet bar $e$, attached to the paper carriage, the pawl *i*, adapted to engage one side of the ratchet bar, the slotted pawl *h*, adapted to engage the opposite side of the ratchet-bar, the adjusting screw *n*, inserted in the pawl *h*, the bearing upon the pawl *i*, and the retractile spring *o*, connected with the pawl *h* and with a fixed support, substantially as specified.

In testimony whereof I have signed this specification in the presence of two subscribing witnesses.

EUGENE A. FORD.

Witnesses:
PHILIP MAURO,
REEVE LEWIS.